United States Patent [19]

Otsuka

[11] Patent Number: 5,003,401
[45] Date of Patent: Mar. 26, 1991

[54] APPARATUS FOR ADJUSTMENT OF OPTICAL AXES IN TV CAMERA

[75] Inventor: Hajime Otsuka, Tokyo, Japan

[73] Assignee: Ikegami Tsushinki Co., Ltd., Tokyo, Japan

[21] Appl. No.: 473,347

[22] Filed: Feb. 1, 1990

[30] Foreign Application Priority Data

Feb. 28, 1989 [JP] Japan .................................. 1-45123

[51] Int. Cl.⁵ .......................... H04N 5/30; H04N 5/225
[52] U.S. Cl. ..................................... 358/229; 358/209; 358/225; 358/41; 354/286
[58] Field of Search ...................... 358/229, 42, 43, 55, 358/218, 222, 225, 909, 209; 354/286, 164, 189, 221; 355/52, 53, 55; 356/150; 350/247

[56] References Cited

U.S. PATENT DOCUMENTS

| | | | |
|---|---|---|---|
| 4,134,129 | 1/1979 | Filipovich | 358/55 |
| 4,437,730 | 3/1984 | Pickett | 350/257 |
| 4,562,463 | 12/1985 | Lipton | 358/88 |
| 4,769,711 | 9/1988 | Date | 358/229 |
| 4,803,557 | 2/1989 | Bridges | 358/229 |

FOREIGN PATENT DOCUMENTS

| | | |
|---|---|---|
| 53-106147 | 9/1978 | Japan . |
| 57-132480 | 8/1982 | Japan . |
| 0204680 | 11/1983 | Japan .................................. 358/229 |
| 60-182878 | 9/1985 | Japan . |
| 60-207108 | 10/1985 | Japan . |

*Primary Examiner*—James J. Groody
*Assistant Examiner*—Safet Metjahic
*Attorney, Agent, or Firm*—Nils H. Ljungman & Associates

[57] ABSTRACT

An apparatus for the adjustment of optical axis in a TV camera, in which a supporting member for integrally supporting an optical lens and a supporting member for integrally supporting an optical system are assembled so that they are fastened in the direction of the optical axis by clamping device, and in the state where the clamping device is loosened, both of the supporting members are relatively moved in a first direction orthogonal to the optical axis by first positioning device and both of the supporting members are relatively moved in a second direction orthogonal to the first direction by second positioning device. By this adjustment apparatus, the adjustment is carried out so that the optical axis of the optical lens is in agreement with the optical axis of the optical system.

27 Claims, 6 Drawing Sheets

APPARATUS FOR ADJUSTMENT OF OPTICAL AXES IN TV CAMERA

BACKGROUND OF THE INVENTION (1) Field of the Invention

The present invention relates to an adjustment apparatus for cancelling discrepancy between the optical axis of an optical lens and the optical axis of an optical system in a TV camera.

(2) Description of the Related Art

In a TV camera, an optical image put in from an optical lens fixed and supported on a lens mount is resolved, in case of a color image, into optical image signals of the three primary colors R (red), G (green) and B(blue) through an optical system (a prism and the like), and these optical image signals are converted to electric optical signals by an image pickup element such as CCD or an image pickup tube and after various processings, video signals are put out from the image pickup element.

In a TV camera of this type, it is necessary that the optical axes of the optical lens, optical system and pickup element should be in agreement with one another at a high precision. The optical system and image pickup element are integrally assembled, for example, by bonding and fixing CCD to a prism, and the axes of the optical system and pickup element can easily be made in agreement with each other. However, even though the center O of the image pickup face is in agreement with the optical axis of the optical system, when discrepancy Δt is produced between this optical axis and the optical axis O' of the optical lens at zoom-up photographing, if photographing is carried out at x magnifications in this state, the image shifts from the center O of the image pickup face toward the optical axis O' by $\Delta t \cdot (x-1)/x$.

This shift becomes a considerably large discrepancy when seen on a monitor picture, and it sometimes happens that the portion to be picked up protrudes from the picture.

In the case where an image pickup tube is used as the image pickup element, the above-mentioned discrepancy of the optical axis can easily be cancelled by magnetically deflecting and regulating optical beams. However, in the case where a solid image pickup element developed recently as an image pickup element for the miniaturization is used, the discrepancy of the optical axis cannot be cancelled and therefore, the discrepancy of the optical axis is a serious problem. Even in case of a TV camera comprising an image pickup tube as the image pickup element, nothing is better than omission of deflection and regulation of beams.

In view of the foregoing, it is necessary that the discrepancy of the optical axis between the optical lens and the optical system should be minimized. According to the conventional technique, the dimensions are strictly controlled by using a special tool at the assembling, or the precisions of parts are increased. However, even if the discrepancy is small at the assembling, backlashes of respective parts increase with the lapse of time, resulting in increase of the discrepancy, or the discrepancy is increased by exchange of lenses.

In order to regulate the thus produced discrepancy of the optical axis, there cannot but be adopted a method in which the camera is disassembled, the optical axis is regulated and the camera is assembled again.

SUMMARY OF THE INVENTION

It is therefore a primary object of the present invention to overcome the disadvantages of the conventional TV cameras and provide an apparatus in which adjustment of reducing discrepancy of the optical axis between the optical lens and optical system in a TV camera can easily be accomplished.

Another object of the present invention is to provide an apparatus for the adjustment of optical axes in a TV camera, which is capable of regulating easily and comprehensively the discrepancy of optical axes without disassembling the TV camera even after assembling.

In accordance with the present invention, these objects can be attained by an apparatus for the adjustment of optical axes in a TV camera where an optical image from an optical lens is put through an optical system into an image pickup element integrated with the optical system, the optical image is converted to an electric image signal by the image pickup element and the electric image signal is put out from the image pickup element, said adjustment apparatus comprising a supporting member for integrally supporting the optical lens, a supporting member for supporting the optical system integrally, clamping means capable of clamping both of the supporting members by a clamping force acting in the direction of the optical axis, first positioning means for relatively moving both of the supporting members in a first direction within a plane orthogonal to the optical axis in the state where the clamping means is loosened, and second positioning means capable of relatively moving both of the supporting members in a second direction orthogonal to the first direction within the plane orthogonal to the optical axis.

In the case where discrepancy of the optical axis is produced between the optical lens and optical system, the supporting member for the optical lens and the supporting member for the optical system are relatively moved in the first direction within the plane orthogonal to the optical axis by the first positioning means in the state where the clamping means is loosened, whereby both of the supporting members are positioned so that the discrepancy in the first direction is cancelled. Then, both of the supporting members are relatively moved in the second direction orthogonal to the first direction within said plane by the second positioning means, whereby both of the supporting members are positioned so that the discrepancy in the second direction is cancelled.

After the discrepancy of the optical axis is thus cancelled by the positioning operation in the two directions, both of the supporting members are clamped again by the clamping means.

Preferably, each of the first and second positioning means has an operating part exposed outwardly of the optical system in one direction of the optical axis so as to be able to operate the operating part from one side of the optical system. By this arrangement, the operation of adjusting the optical axis can be performed completely without disassembling the TV camera. In order to facilitate the operation, it is preferred that the operating parts be arranged substantially on the same plane.

For the same reason, it is preferred that the operating part of the clamping means be arranged on the same plane as the plane on which the operating parts of the positioning means are arranged and directed in one direction of the optical axis.

In accordance with one preferred embodiment of the present invention, each of the supporting members comprises a plate-shaped member, an intermediate plate is interposed between the plate-shaped members, a guide device is disposed to guide one of the plate-shaped members and the intermediate plate so that they can mutually slide only in said first direction, and another guide device is disposed to guide the other plate-shaped plate and the intermediate plate so that they can mutually slide only in said second direction. This slide guiding is advantageously accomplished by forming a long groove or long hole on one member and a key pin to be engaged with the long groove or long hole on the other member. The slide quantity can easily be set by engaging an eccentric shaft supported on one member with a long groove or long hole formed on the other member and turning an operating part of the eccentric shaft from the outside.

The supporting member may be a combination of a frame and a movable plate that can freely move in the first and second directions in the interior of the frame. In this embodiment, an elastic spring and a rotary cam can be arranged on the frame so that the position of the movable plate is adjusted by operating the rotary cam. Freely slidable guide members are arranged on both the sides of the movable plate, and movement of the movable plate in the first direction is effected in the interior of the frame integrally with the guide members while the movement of the movable plate in the second direction is effected by sliding of the movable plate in the second direction relatively to the guide members.

The supporting members can be a movable plate and a constrained link of each of a plurality of parallel link mechanisms, respectively. In this embodiment, both the ends of a movable link opposite to the constrained link are engaged with the long groove or long hole formed on the movable plate, and by the moving operation of the movable link, relative movement is effected between the constrained link and the movable plate to shift each parallel link mechanism in the first or second direction, whereby the adjustment of the optical axis can easily be accomplished.

When both the supporting members are clamped in the direction of the optical axis, it is sufficient if the clamping means exerts a clamping force only in the direction of the optical axis. In the case where the clamping force of the clamping means includes a turning movement of a screw or the like, this turning force is transferred to the supporting member to turn the supporting member, with the result that undesirable influences are imposed on the operation of adjusting the optical axis. In order to avoid this disadvantage, the screw in the clamping member is covered with a collar or the like so that the turning force of the clamping member is cancelled by slippage with the collar.

Embodiments of the present invention will now be described in detail. Of course, the present invention is by no means limited by these embodiments but many modifications and changes can be made without departing from the scope of the present invention.

DETAILED DESCRIPTION OF THE PREFERRED EMBODIMENTS

The present invention will now be described in detail with reference to embodiments illustrated in the accompanying drawings.

Referring to FIGS. 1 through 5, a lens mount 1 comprising a substantially plate-shaped member, a horizontally sliding plate or intermediate plate 2 comprising a substantially plate-shaped movable member, a vertically sliding plate 3 comprising a substantially plate-shaped member and a case 54 of an optical system 5 are arranged in a line along the direction of the optical axis within a plane orthogonal to the optical axis.

In the lens mount 1, a supporting frame of an optical lens, not shown in the drawings, is engaged with an engaging member 10 having a trapezoidal section, which is fixed to an upper part of a front face of the lens mount 1, whereby the optical lens is fixed and supported to the lens mount. In short, the lens mount 1 constitutes a supporting member for the optical lens having an optical axis $O_1$. Two key pins 11 and 12 are fixed to the back face of the lens mount 1 to project backward in the direction of the optical axis. Long grooves or long holes 21 and 22 extending in the horizontal direction are formed on the horizontal sliding plate 2. These key pins 11 and 12 are engaged with the long holes 21 and 22 extending in the horizontal direction, whereby the horizontal sliding plate 2 is attached so that the horizontal sliding plate 2 can freely slide on the back face of the lens mount 1 in the horizontal direction. A screw 43 provided with a spring washer 41 and a flat washer 42, which extends backward in the direction of the optical axis, pierces through another long hole 23 formed on the horizontal direction, and the screw 43 is screwed in a screw hole 13 formed at the confronting position of the lens mount 1, whereby the horizontal sliding plate 2 can be clamped to the lens mount 1 in the direction of the optical axis.

A horizontal adjustment shaft 44 for adjusting the horizontal position of the horizontal sliding plate 2 is an eccentric cam member comprising a disk part 44a on the front end, an intermediate eccentric cam part 44b and an operating part 44c on the rear end. The operating part 44c has an engaging groove for a screwdriver. The disk part 44a on the front end is fitted and supported on a circular groove hole 14 formed on the back face of the lens mount 1 rotatably around the axis thereof, the eccentric cam part 44a located at a point intermediate in the axial direction is engaged with a vertically extending long hole 24 formed on the horizontal sliding plate 2, and the operating part 44c on the rear end is extended from the horizontal sliding plate 2 through the side portion of the vertical sliding plate 3 outwardly of the case 54 for the optical system in the backward direction of the optical axis, whereby the horizontal adjustment shaft 44 is attached.

In the state where the screw 43 is loosened, the horizontal adjustment shaft 44 is rotated by engaging a screwdriver with the operating part 44c from the rear side of the vertical sliding plate 3, whereby the eccentric cam part 44b is rotated and the horizontal sliding plate 2 is moved within a predetermined range in the horizontal direction by the function of the long holes 21 and 22 and key pins 11 and 12 as the guide device. Thus, the positioning adjustment is accomplished.

The vertical sliding plate 3 is clamped in the direction of the optical axis by a plurality of bolts 61 on the front face of a case 54 for the optical system 5 provided with filters 51 on of which is positioned on the optical axis $O_2$ and a prism 52 and having an integrally connected solid state image pick-up device 53 such as CCD. Two concave grooves 31 and 32 to be fitted with the horizontal sliding plate 2 are formed on the front face of the vertical sliding plate 3. The vertical dimensions of the concave grooves 31 and 32 are determined so that the horizontal sliding plate 2 and the vertical sliding plate 3 can relatively slide by a predetermined distance in the vertical direction. Fixed key pins 33 and 34 projecting in the direction of the optical axis are arranged on the bottoms of the concave grooves 31 and 32, and two long holes 25 and 26 extending in the vertical direction, which are formed in the horizontal sliding plate 2, are engaged with the key pins 33 and 34, whereby the vertically sliding plate 3 is attached to the horizontal sliding plate 2 movably in the vertical direction.

Two screws 64A and 64B provided with spring washers 62A and 62B and flat washers 63A and 63B, respectively, pierce through holes 35A and 35B formed in the vertical sliding plate 3 and by the side portion of the horizontal sliding plate 2, and the top ends of the screws 64A and 64B are screwed into screw holes 15 and 16 formed at confronting positions in the lens mount 1, whereby the horizontal sliding plate 2 is clamped to the lens mount 1 in the direction of the optical axis. In this embodiment, the spring washers 62A and 62B and flat washers 63A and 63B slip relatively to heads of the screws 64A and 64B, whereby the rotating forces of the screws 64A and 64B are prevented from being transferred to the vertical sliding plate 3.

A vertical adjustment shaft 65 for positioning the vertical sliding plate 3 in the vertical direction is an eccentric cam member extending backward in the direction of the optical axis with a disk part 65a being as an intermediate part and comprising an eccentric cam part 65b on the front end and an operating part 65c on the rear end, which has an engaging groove with which a screwdriver can be engaged. The intermediate disk part 65a is fitted to a circular groove hole 36a formed on the front face of the vertical sliding plate 3 so that the intermediate disk part 65a can freely rotate around the axis, the eccentric cam part 65b on the front end is engaged with a long hole 27 formed on the horizontal sliding plate 2, which extends in the horizontal direction, and the operating part 65c on the rear end is extended backward in the direction of the optical axis from a groove hole 36 formed on the back face of the vertical sliding plate 3 to have a diameter smaller than that of the groove hole 36a, whereby the vertical adjustment shaft 65 is attached.

In this embodiment, if the vertical adjustment shaft 65 is rotated from the back face of the vertical sliding plate 3 by engaging the screwdriver with the engaging groove of the operating part 65c in the state where the screws 64A and 64B are loosened, the eccentric cam part 65b engaged with the long hole 27 is rotated, whereby the horizontal sliding plate 2 and vertical sliding plate 3 are relatively moved by a predetermined distance in the vertical direction by the function of the long holes 24 and 26 and key pins 33 and 34 as the guide device. Thus, the positioning adjustment is accomplished. At this point, the horizontal sliding plate 2 is fixed to the lens mount 1 by driving the screw 43, and therefore, only the vertical sliding plate 3 moves in the vertical direction.

Figure 1:
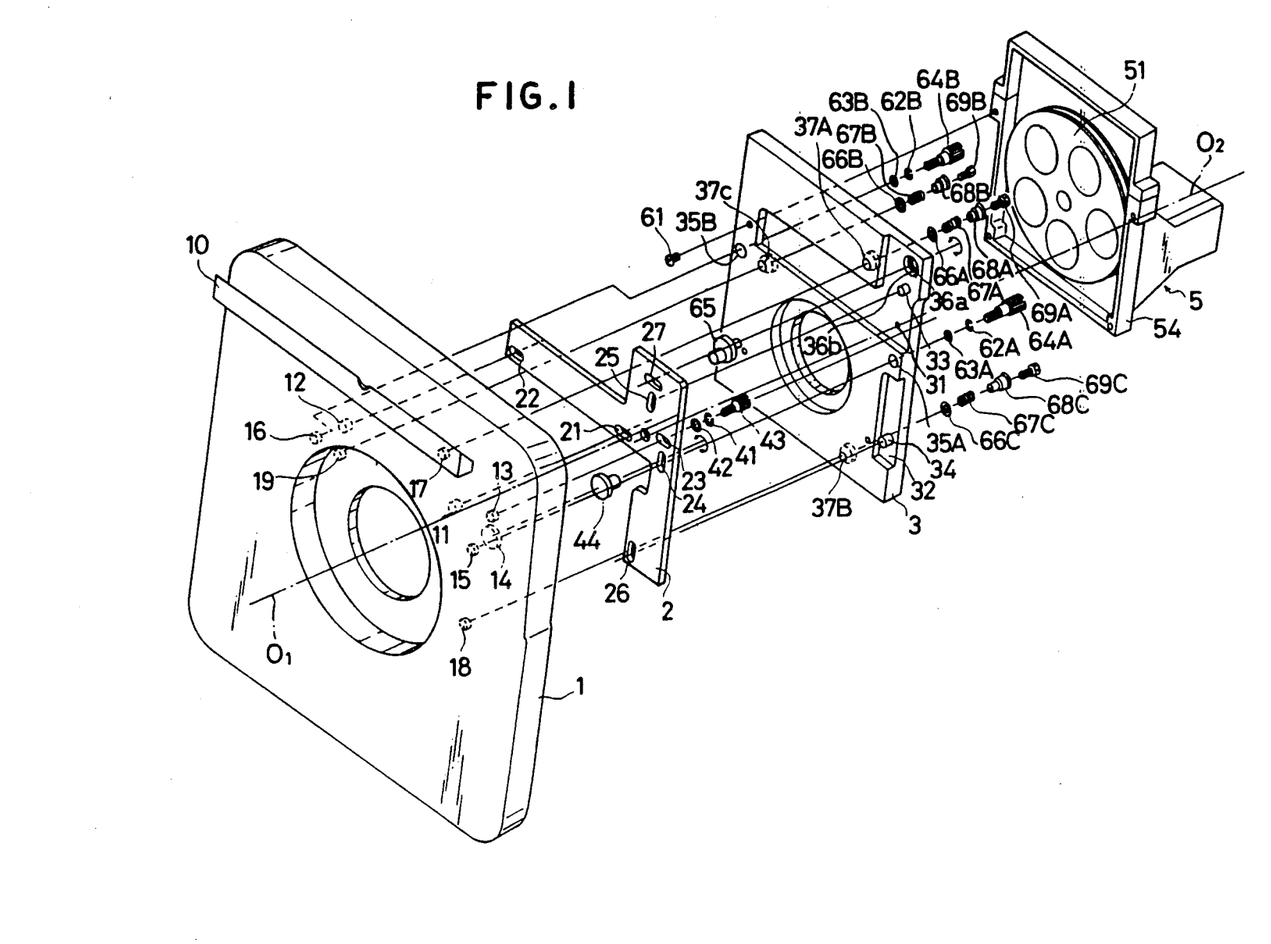
FIG. 1 is a perspective view illustrating the construction of a first embodiment of the present invention.
Figure 2:
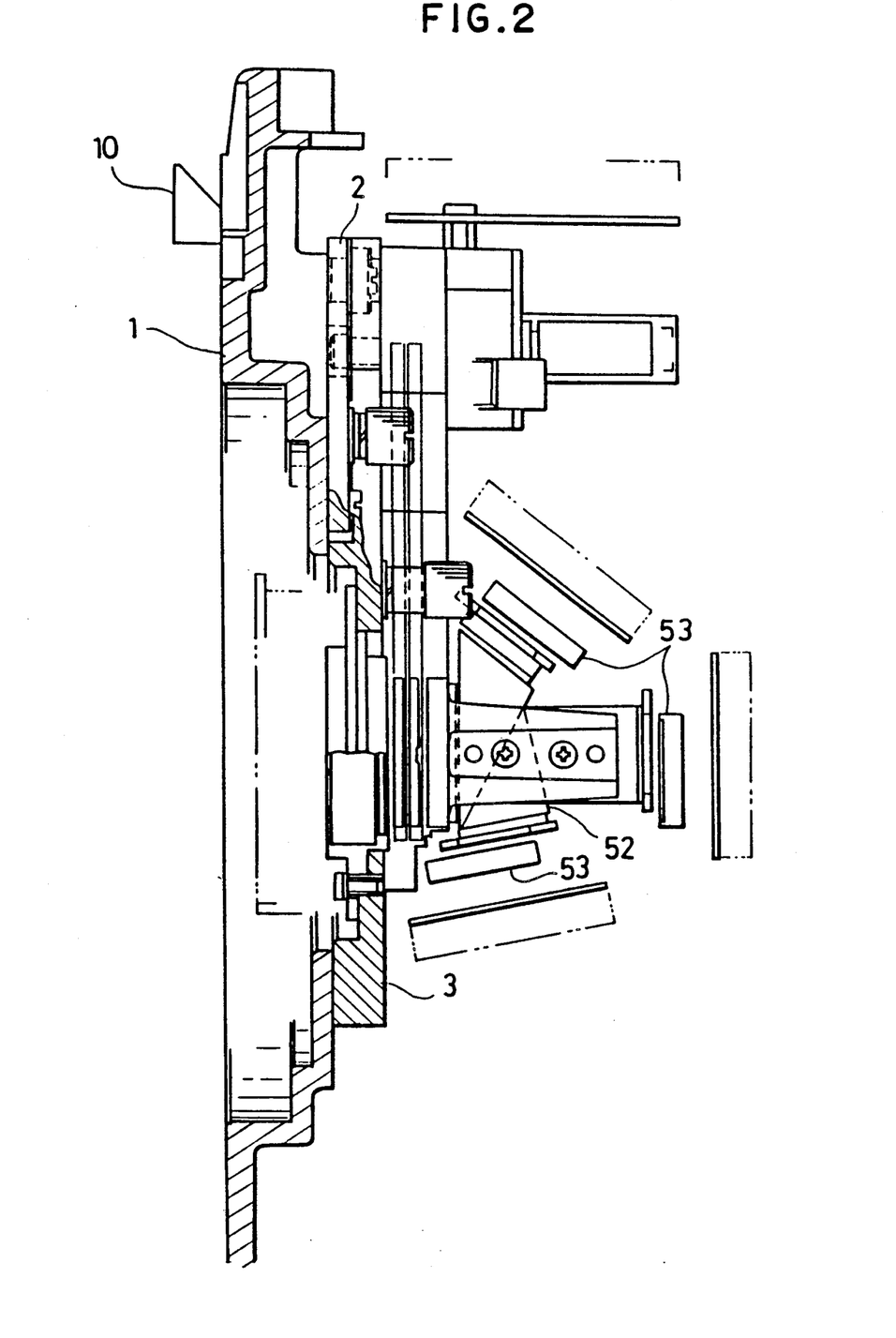
FIG. 2 is a diagram illustrating the partially sectional left side of the embodiment shown in FIG. 1.
Figure 5:
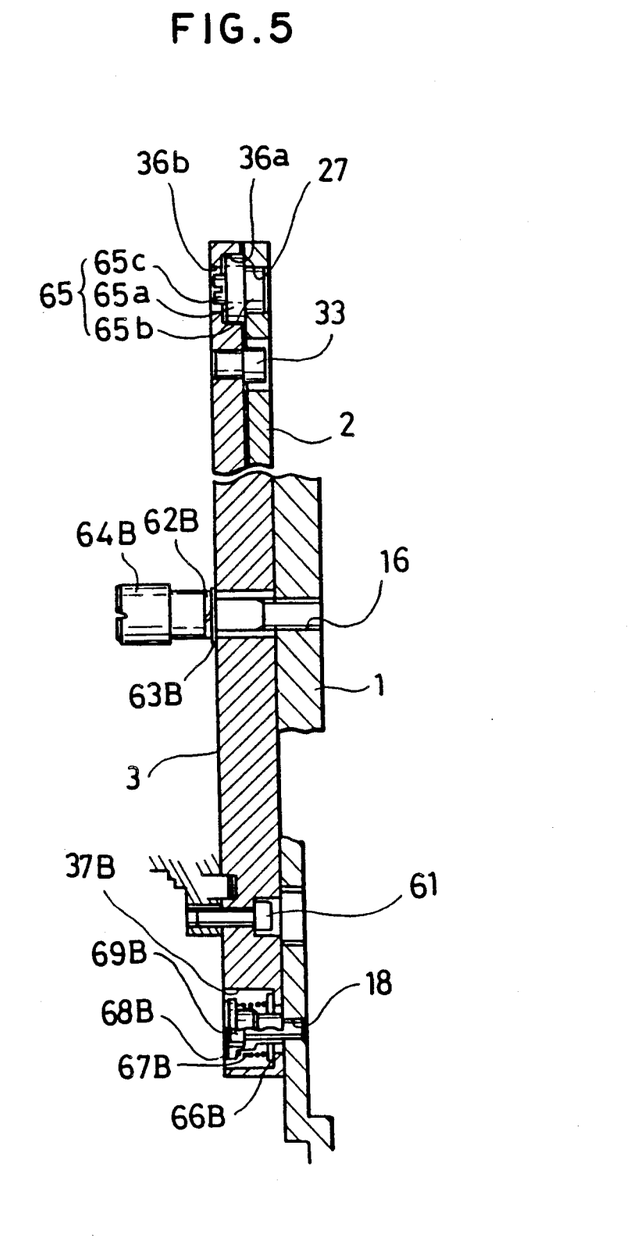
FIG. 5 is a view showing the section taken along the line V—V in FIG. 3.

An auxiliary supporting device is disposed to prevent the horizontal sliding plate 2 and vertical sliding plate 3 from separating from the lens mount 1 when the screws 64A and 64B are loosened. More specifically, as shown in FIG. 1 and FIG. 5, collars 68A, 68B and 68C are inserted into stepped holes 37A, 37B and 37C formed on the vertical sliding plate 3, and washers 66A, 66B and 66C and compression springs 67A, 67B and 67C arranged between the steps of the stepped holes 37A, 37B and 37C and the steps of the collars 68A, 68B and 68C, respectively. Screws 69A, 69B and 69C running through the inner sides collars 68A, 68B and 68C are screwed into screw holes 17, 19 and 18 formed on he lens mount 1, whereby the collars 68A, 68B and 68C are gripped between the heads of the screws 69A, 69B and 69C and the back face of the lens mount 1. Incidentally, a clearance allowing the vertical sliding plate 3 to move at the positioning adjustment in the vertical direction is formed between the collars 68A, 68B and 68C and the holes 37A, 37B and 37C. By this arrangement, the vertical sliding plate 3 is auxiliarily supported with a play on the collars 68A, 68B and 68C and urged to be contacted with the lens mount 1 by resilient force of the coil springs 67A, 67B and 67C.

When the screws 69A, 69B and 69C are turned for clamping, the heads of the screws hit and slip on the steps of the collars 68A, 68B and 68C. Accordingly, only the clamping force in the axial direction is transferred to the vertical sliding plate 3 and lens mount 1 through the springs 67A, 67B and 67C and therefore, no slip is caused between the vertical sliding plate 3 and the lens mount 1 and no bad influence is imposed on the adjustment of the optical axis.

The series of the operations for adjusting the optical axis will now be described. A cover (not shown in the drawings) of the TV camera which covers the rear portion of the lens mount 1 is opened, and the screw 43 fastening the horizontal sliding plate 2 to the lens mount 1 and the screws 64A and 64B fastening the vertical sliding plate 3 to the lens mount 1 are loosened by a screwdriver from the rear side of the vertical sliding plate. Incidentally, these screws 43, 64A and 64B constitute the clamping means exerting the function of clamping the lens mount 1 as the lens-supporting member and the vertical sliding plate 3 as the supporting member connected to the optical system 5 to support the optical system 5.

Then, when the horizontal sliding plate 2 as the intermediate plate is moved in the horizontal direction by operating the horizontal adjustment shaft 44 in the rear side of the vertical sliding plate 3, the vertical sliding plate 3 and the optical system 5 connected thereto are integrally moved in the same direction. The movement and positioning are effected so that the discrepancy between the optical axis $O_1$ of the lens mount 1 and the optical axis $O_2$ of the optical system (hereinafter referred to as "discrepancy of the optical axes") in the horizontal direction is reduced to zero. Then, the screw 43 is driven to clamp the horizontal sliding plate 2 to the lens mount 1 in the rear side of the vertical sliding plate 3. Thus, the adjustment of the optical axis for cancelling the discrepancy of the optical axis in the horizontal direction is completed.

Then, the vertical adjustment shaft 65 is similarly operated to move the vertical sliding plate 3 and optical system 5 in the vertical direction relatively to the horizontal sliding plate 2 and lens mount 1 until the discrepancy in the vertical direction is reduced to zero. Then, the screws 64A and 64B are driven in the rear side of the vertical sliding plate 3 to clamp the vertical sliding plate 3 to the lens mount. Thus, the adjustment of the optical axis for cancelling the discrepancy of the optical axis in the vertical direction is completed, and the optical axis of the optical lens is made in agreement with the optical axis of the optical system.

Figure 3:
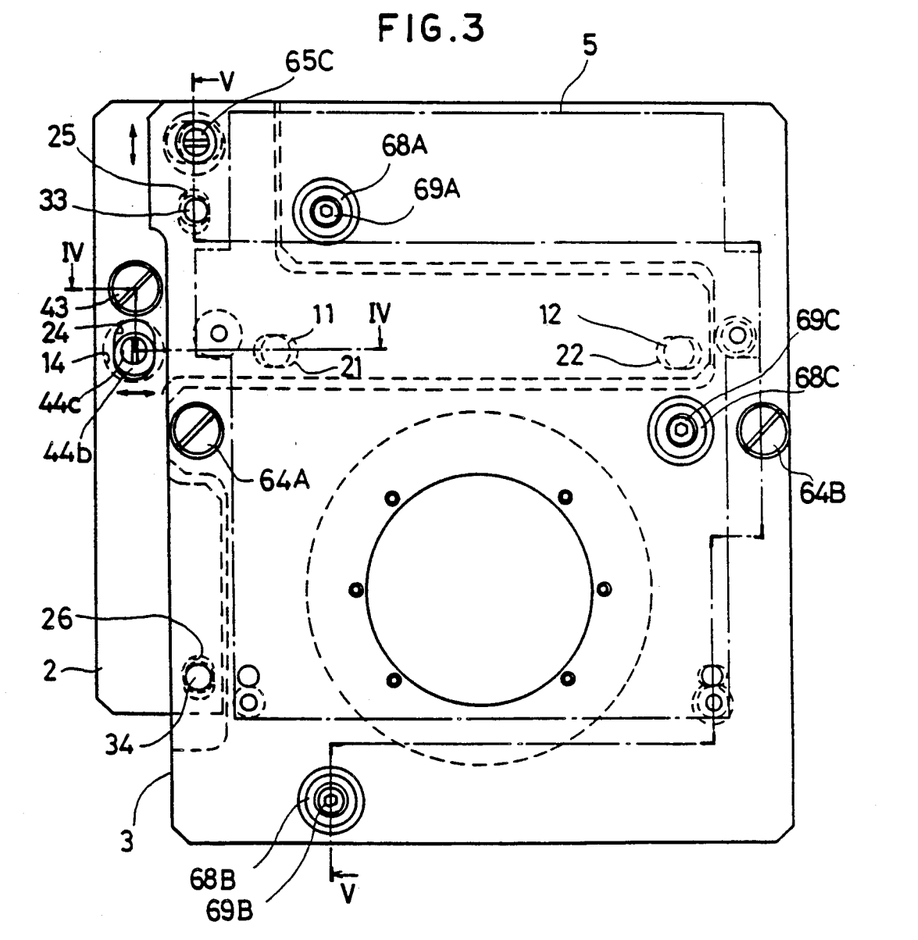
FIG. 3 is a back view of the embodiment shown in FIG. 1, from which a case of the optical system is omitted.
Figure 4:
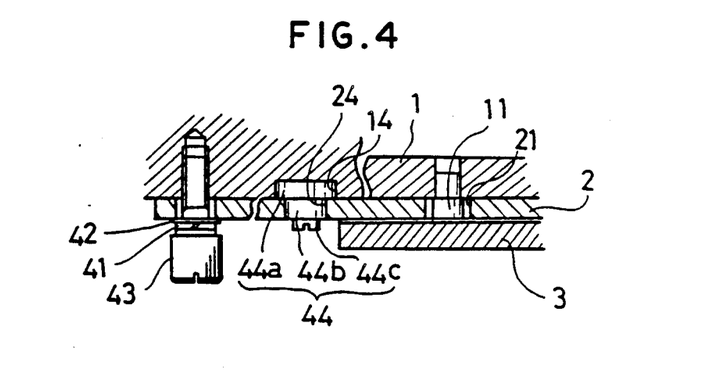
FIG. 4 is a view showing the section taken along the line IV—IV in FIG. 3.

Of course, the above-mentioned optical axis-adjusting operation is carried out in the state where the case of the optical system is attached to the vertical sliding plate 3. Accordingly, in this attached state, at least the adjusting elements should be exposed outwardly of the case 54 in the backward direction of the optical axis and also on the back face of the vertical sliding plate 3. The adjusting elements referred to herein are heads of the screws 43, 64A and 64B, the operating part 44c of the horizontal adjustment shaft 44 and the operating part 65c of the vertical adjustment shaft 65, as shown in FIG. 3.

As is apparent from the foregoing description, the discrepancy of the optical axis can be regulated easily and precisely by effecting the positioning operations independently in the horizontal direction and the vertical direction only by simple operations of screws without disassembling the TV camera. Especially, since the adjustment can be performed in the lens-attached state, not only the discrepancy produced with the lapse of time or by exchange of lenses but also the discrepancy produced by other factors can be generally cancelled, and high-precision adjustment becomes possible. Therefore, a high precision is not required for assembling, and the manufacturing efficiency is increased and the cost is reduced.

The present embodiment has been explained with reference to the color TV camera. However, the problem of discrepancy of optical axes similarly arises in a monocolor TV camera. The present embodiment having the above-mentioned construction can similarly be applied to the monocolor camera (embodiments described hereinafter can be applied to not only a color TV camera but also a monocolor TV camera). As pointed out hereinbefore, in the case where an image pick-up tube is used as the solid state image pick-up device, certain discrepancy of the optical axis can be cancelled by deflection, but also in this case, it is preferred that adjustment be carried out so that the optical axes are mechanically made in agreement with each other. Moreover, since it often happens that complete adjustment is impossible only by deflection, the present invention is sufficiently applicable to the above-mentioned case.

As is apparent from the foregoing explanation of the operations, the first positioning means comprises the key pins 11 and 12 and horizontally extending long holes 21 and 22 acting as the guide device for guiding the relative movement of the mount 1 integrally supporting the optical lens and the horizontal sliding plate 2 in the horizontal direction, and the vertically extending long hole 24 and horizontal adjustment shaft 44 for moving the horizontal sliding plate 2 in the horizontal direction.

The second positioning means comprises the vertical sliding plate 3 moving in the vertical direction relatively to the horizontal sliding plate 2 fastened to the lens mount 1, the guide device for guiding the movement of the vertical sliding plate 3 in the vertical direction, which includes the key pins 33 and 34 and the long holes 25 and 26 extending in the longitudinal direction, and the operating device for moving the vertical sliding plate 3 in the vertical direction, which includes the long hole 27 extending in the horizontal direction and the vertical adjustment shaft 65.

The first and second directions need not always be horizontal and vertical directions, but may be directions orthogonal to each other with respect to the optical axis.

Incidentally, the vertical sliding plate 3 can be formed integrally with the optical system 5.

Figure 6:
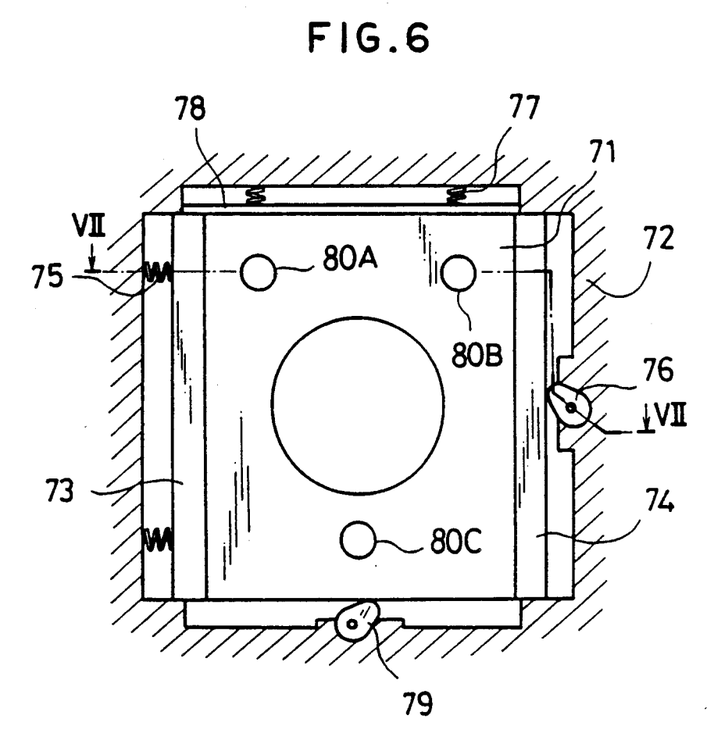
FIG. 6 is a back view illustrating the outline of a second embodiment of the present invention.
Figure 7:
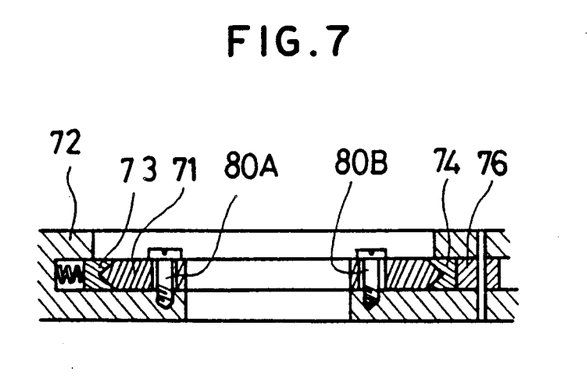
FIG. 7 is a view showing the section taken along the line VII—VII in FIG. 6.

FIGS. 6 and 7 illustrate the outline of the construction of the second embodiment of the present invention.

Referring to FIGS. 6 and 7, a movable plate 71 is substantially connected to the optical system, and a hatched frame 72 located on the outer side of the movable plate 71 is substantially connected to a lens mount. This connection relation may be reversed.

The movable plate 71 has a substantially rectangular shape, and both the side ends of the movable plate 71 are fitted in V-grooves formed on the inner side faces of vertical guide members 73 and 74 relatively movably in the vertical direction. One of vertical guide members 73 and 74 and the movable plate 71 are fitted in a groove formed on the inner face of the frame 72 movably in the horizontal direction. The outer face of one vertical guide member 74 abuts against a rotary cam 76 pivoted on the frame 72, and the movable plate 71 and the vertical guide members 73 and 74 are pressed and urged to the rotary cam 76 by a compression spring 75 disposed on the outer side of the other vertical guide member 73 and the inner face of the frame 72.

Both the side edges of the movable plate 71 can move in the vertical direction while being guided by the vertical guide member 74, and the lower end of the movable plate 71 abuts against a rotary cam 79 pivoted on the frame 72 while the upper end of the movable plate 71 is pressed and urged to the rotary cam 79 through a plate member 78 by a spring 77. Screws 80A, 80B and 80C constitute clamping means for clamping the movable plate 71 to the frame 72 after the positioning adjustment.

In the above-mentioned construction, the cam 76 is rotated from the outer end to move the movable plate 71 together with the vertical guide members 73 and 74 in the horizontal direction and the positioning is effected so that the discrepancy of the optical axis in the horizontal direction is cancelled. Then, the cam 79 is rotated to move the movable plate 71 along the V-grooves of the vertical guide members 73 and 74 and the positioning is effected so that the discrepancy of the optical axis in the vertical direction is cancelled. Then, the screws 80A, 80B and 80C as the clamping means are driven to clamp the movable plate 71 to the frame 72. The optical axis extends in the vertical direction to the sliding plate 71.

In this embodiment, as in the precedent embodiment, the movable plate 71 capable of moving in the same direction integrally with the first moving member (vertical members 73 and 74) movable only in the horizontal direction is moved in the direction orthogonal to said direction, whereby the optical axis can be regulated in two directions orthogonal to each other at a high precision.

Incidentally, the guiding function in the horizontal or vertical direction by the frame 72 may be replaced by the engagement structure between key pins and long holes or by the moving mechanism comprising a screw moving in the axial direction instead of the cam.

Figure 8:
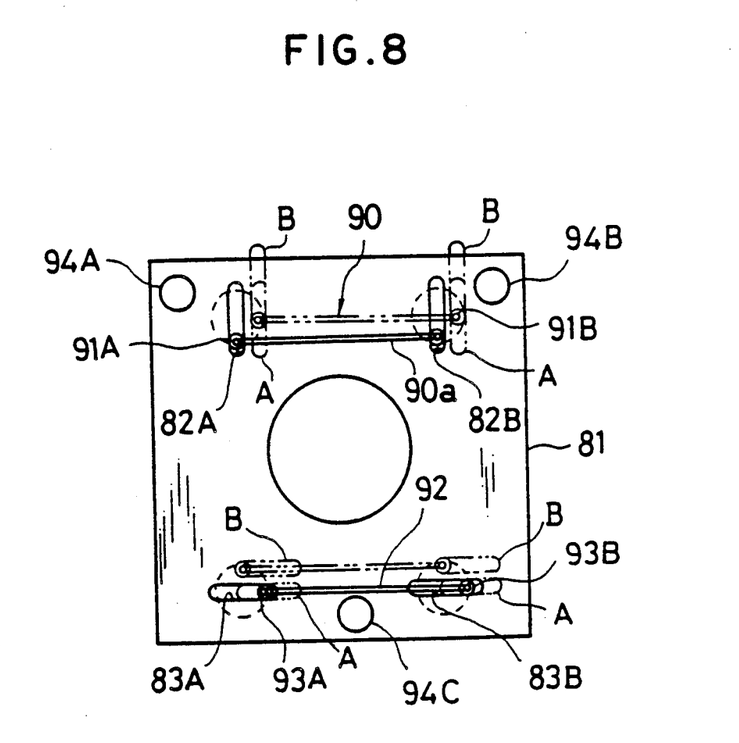
FIG. 8 is a back view illustrating the outline of the construction of a third embodiment of the present invention.

FIG. 8 illustrates the outline of the construction of the third embodiment of the present invention.

Referring to FIG. 8, a movable plate 81 is disposed in the plane orthogonal to the optical axis and is substantially connected to the optical system (or the lens mount). A pair of long holes 82A and 82B extending in the vertical direction are formed above the movable plate 81. A parallel link mechanism 90 is attached to the lens mount (or the optical system). More specifically, the parallel link mechanism 90 is constructed by a pair of eccentric cams 91A and 91B rotatably pivoted on the lens mount which constitutes a constrained link, and a movable link 90a confronting the constrained link and having both the ends pivoted on the eccentric cams 91A and 91B. Cam rollers of the eccentric cams 91A and 91B are anchored on the long holes 82A and 82B, respectively. Long holes 83A and 83B are formed on the lower part of a sliding plate 81, and cam rollers of eccentric cams 93A and 93B of a parallel link mechanism 92 similarly supported on the side of the lens mount (or the side of the optical system) are engaged with these long holes 83A and 83B. Screws 94A, 94B and 94C are disposed as clamping means for substantially fastening the movable plate 81 to the lens mount.

In the above-mentioned structure, if one eccentric cam 91A or 91B is turned by a turning member such as a screw driver, both of the eccentric cams 91A and 91B are turned by the same angle through the parallel link mechanism 92. By the guiding action exerted by the engagement between the eccentric cams 93A and 93B and the long holes 83A and 83B, the movable plate 81 is moved in the horizontal direction to cancel discrepancy of the optical axis in the horizontal direction (the position indicated by chain line A in FIG. 8). Then, the other eccentric cams 93A and 93B are rotated, and by the guiding function exerted by the engagement between the eccentric cam 91 and the long hole 82, the movable plate 81 is moved in the vertical direction to cancel discrepancy of the optical axis in the vertical direction (the position indicated by chain line B in FIG. 8). Then, in the same manner as in the foregoing embodiments, the lens mount and the optical system are clamped to each other through the movable plate 81 by means of screws 94A, 94B and 94C.

Also in this embodiment, the optical axis can be regulated at a high precision by positioning the movable plate with respect to the horizontal and vertical directions.

It is preferred that rotary cams 76 and 79 shown in FIGS. 6 and 7 and the eccentric cams 91A, 91B, 93A and 93B shown in FIG. 8 be exposed to the outside of the optical system so that the cams can be operated from the outside.

As is apparent from the foregoing description, according to the present invention, by effecting the positioning by the movement in the two directions orthogonal to the each other within the plane orthogonal to the optical axis without disassembling the TV camera, discrepancy of the optical axis can be cancelled easily and precisely, and not only discrepancy produced with the lapse of time or by exchanges of lenses but also discrepancy produced by various factors can be generally cancelled and adjustment of the optical axis can be accomplished at a high accuracy. Accordingly, a high precision is not required for the assembling operation, and the manufacturing efficiency can be increased and the cost can be reduced.

We claim:

1. An apparatus for the adjustment of optical axis in a TV camera where an optical image from an optical lens is put through an optical system into an image pick-up device integrated with the optical system, the optical image is converted to an electric image signal by the image pick-up device and the electric image signal is put out from the image pick-up device, said adjustment apparatus comprising a supporting member for integrally supporting said optical lens, a supporting member for supporting said optical system integrally, clamping means capable of clamping both of said supporting members by a clamping force acting in the direction of said optical axis, first positioning means for relatively moving both of the supporting members in a first direction within a plane orthogonal to said optical axis in the state where the clamping means is loosened, and second positioning means capable of relatively moving both of said supporting members in a second direction orthogonal to the first direction within the plane orthogonal to the optical axis where the clamping means is loosened.

2. An apparatus for the adjustment of optical axis in a TV camera according to claim 1, wherein each of said first and second positioning means has an operating part exposed outwardly of the optical system in the same direction of the optical axis.

3. An apparatus for the adjustment of optical axis in a TV camera according to claim 2, wherein said operating part is arranged substantially in one plane orthogonal to the optical axis.

4. An apparatus for the adjustment of optical axis in a TV camera according to claim 1, wherein said clamping means is screw means extending in the same direction of the optical axis and having a head exposed outwardly of the optical system.

5. An apparatus for the adjustment of optical axis in a TV camera according to claim 4, wherein said screw means comprises collars interposed between the head and both of said supporting members.

6. An apparatus for the adjustment of optical axis in a TV camera according to claim 1, wherein each of said supporting members is a plate-shaped member arranged in a plane substantially orthogonal to the optical axis, an intermediate plate is disposed between both of said plate-shaped members, said first positioning means comprises a first guide device for guiding and relatively moving one of the plate-shaped member and said intermediate plate integrally only in said first direction and first operating means for effecting said relative movement in said first direction, and said second positioning means comprises a second guide device for guiding and relatively moving said plate-shaped member and said intermediate plate only in said second direction and second operating means for effecting said relative movement in said second direction.

7. An apparatus for the adjustment of optical axis in a TV camera according to claim 6, wherein each of operating parts of said first and second operating means extends in the same direction of the optical system and is exposed outwardly of the optical system.

8. An apparatus for the adjustment of optical axis in a TV camera according to claim 7, wherein said operating parts of said first and second operating means are exposed outward on one side face of said one plate-shaped member so that said first and second operating means can be operated from the outside of said optical system.

9. An apparatus for the adjustment of optical axis in a TV camera according to claim 6, wherein said first guide device comprises a long groove extending in said one direction, which is formed on one of said one plate-shaped member and said intermediate plate and a key pin formed on the other of said one plate-shaped member and said intermediate plate to project in the direction of the optical axis, said key pin being slidably engaged with said long groove.

10. An apparatus for the adjustment of optical axis in a TV camera according to claim 6, wherein said second guide device comprises a long groove extending in said second direction, which is formed on one of said other plate-shaped member and said intermediate plate and a key pin formed on the other of said other plate-shaped member and said intermediate plate to project the direction of the optical axis, said key pin being slidably engaged with said long groove.

11. An apparatus for the adjustment of optical axis in a TV camera according to claim 6, wherein said first operating means comprises a long groove extending in said second direction, which is formed on one of said one plate-shaped member and said intermediate plate, and an eccentric shaft supported on the other of said one plate-shaped member and said intermediate plate rotatably around the axis thereof and projected in the direction of the optical axis, said eccentric shaft being slidably engaged with said long groove and said eccentric shaft having an operating part which extends in the direction of the optical axis and is exposed outwardly of the surface of said other plate-shaped member so that said eccentric shaft can be turned and operated from the outside.

12. An apparatus for the adjustment of optical axis in a TV camera according to claim 6, wherein said second operating means comprises a long groove extending in said first direction, which is formed on one of said other plate-shaped member and said intermediate plate, and an eccentric shaft supporting on the other of said other plate-shaped member and said intermediate plate rotatably around the axis thereof and extends in the direction of the optical axis, said eccentric shaft being slidably engaged with said long groove and having an operating part exposed outwardly on the surface of said other plate-shaped member so that said eccentric shaft can be rotated and operated from the outside.

13. An apparatus for the adjustment of optical axis in a TV camera according to claim 1, wherein said image pick-up device is a solid state pick-up device.

14. An apparatus for the adjustment of optical axis in a TV camera according to claim 1, wherein said image pick-up device is an image pick-up tube.

15. An apparatus for the adjustment of optical axis in a TV camera according to claim 1, wherein one of said supporting members comprises a movable plate having a substantially rectangular shape substantially orthogonal to the optical axis, and the other supporting member comprises a frame supporting an internal space having a substantially rectangular cross-sectional shape movably in said first direction and said second direction.

16. An apparatus for the adjustment of optical axis in a TV camera according to claim 15, wherein said first positioning means comprises a pair of guide members engaged with the side edge in said first direction of said movable plate slidably in said second direction and supported on said frame slidably in said first direction, first elastic member elastically urging said movable plate in said first direction and first rotary cam means attached to said frame to support said movable plate at a desired position in said first direction against the elastic force of said first elastic member, and said second positioning means comprises a second elastic member elastically urging said movable plate in said second direction and rotary cam means attached to said frame for supporting said movable plate at a desired position in said second direction against the elastic force of said second elastic member.

17. An apparatus for the adjustment of optical axis in a TV camera according to claim 1, wherein one of said supporting members comprises a plate-shaped member substantially orthogonal to the optical axis, the other supporting member comprises one constrained link of each of two parallel link mechanisms, said first positioning means is constructed by slidably engaging both the ends of a movable link corresponding to said constrained link of the first parallel link mechanism with a long groove formed on said plate-shaped member to extend in said second direction, said second positioning means is constructed by slidably engaging both the ends of a movable link confronting to said constrained link of the second parallel link mechanism with a long groove formed on said plate-shaped member to extend in said first direction, and each of said parallel link mechanisms has an operating end for moving and operating both the ends of said movable link confronting to the constrained link relatively to the constrained link.

18. An apparatus for the adjustment of optical axis in a TV camera where an optical image from an optical lens is put through an optical system into an image pickup element integrated with the optical system, the optical image is converted to an electric image signal by the image pickup element and the electric image signal is put out from the image pickup element, said adjustment apparatus comprising a lens mount for integrally supporting said optical lens, a first sliding plate which is engaged with the back face of said lens mount slidably only in a first direction within plane orthogonal to the optical axis, a second sliding plate for integrally supporting said optical system on the back face thereof, which is engaged with the back face of said first sliding plate only in a second direction orthogonal to said first direction, first clamping means supporting said first sliding plate on the back face of said lens mount in the direction of the optical axis so that said first sliding plate can be fastened or allowed to slide, second clamping means for supporting said second sliding plate on the back face of said lens mount in the direction of the optical axis so that said second sliding plate can be fastened or allowed to slide, first positioning means for relatively moving said lens mount and said first sliding plate integrally in said first direction in the state where said first clamping means is loosened, and a second positioning means for relatively moving said first and second sliding plates in said second direction in the state where said second clamping means is loosened.

19. An apparatus for the adjustment of optical axis in a TV camera according to claim 18, wherein each of said first and second clamping means and said first and second positioning means has an operating part extending in the same direction of the optical axis and exposed outwardly of the optical system on the back face of said second sliding plate.

20. An apparatus for the adjustment of optical axis in a TV camera according to claim 18, wherein a long groove extending in said first direction is formed on one of said lens mount and said first sliding plate, and a key pin projecting in the direction of the optical axis is arranged on the other of said lens mount and said first sliding plate, said key pin being slidably engaged with said long groove.

21. An apparatus for the adjustment of optical axis in a TV camera according to claim 18, wherein a long groove extending in the second direction is formed on one of said two sliding plates and a key pin projecting in the direction of the optical axis is arranged on the other sliding plate, said key pin being slidably engaged with said long groove.

22. An apparatus for the adjustment of optical axis in a TV camera according to claim 18, wherein said first positioning means comprises a first guide device for relatively moving and guiding said lens mount and said first sliding plate integrally only in said first direction and first operating means for effecting said relative movement in said first direction, and said second positioning means comprises a second guide device for relatively moving and guiding said first and second sliding plates only in said second direction and second operating means for effecting said relative movement in said second direction.

23. An apparatus for the adjustment of optical axis in a TV camera according to claim 18, wherein operating parts of said first and second operating means are exposed outwardly of said optical system on the back face of said second sliding plate.

24. An apparatus for the adjustment of optical axis in a TV camera according to claim 18, wherein said first guide device comprises a long groove extending in said first direction, which is formed on one of said lens mount and said second sliding plate and a key pin projecting in the direction of the optical axis, which is slidably arranged on the other of said lens mount and said second sliding plate.

25. An apparatus for the adjustment of optical axis in a TV camera according to claim 18, wherein said second guide device comprises a long groove extending in said second direction is formed on one of said first and second sliding plates and a key pin projecting in the direction of the optical axis, which is slidably engaged with the other of said first and second sliding plate.

26. An apparatus for the adjustment of optical axis in a TV camera according to claim 18, wherein said first operating means comprises a long groove extending in said second direction, which is formed on one of said lens mount and said first sliding plate and an eccentric shaft projecting in the direction of the optical axis, which is supported on the other of said lens mount and said first sliding plate rotatably around the axis thereof and is slidably engaged with said long groove.

27. An apparatus for the adjustment of optical axis in a TV camera according to claim 18, wherein said second operating means comprises a long groove extending in said first direction, which is formed on one of said two sliding plates and an eccentric shaft extending in the direction of the optical axis, which is rotatably supported on the other sliding plate and is slidably engaged with said long groove.

* * * * *